United States Patent
Liu

(10) Patent No.: US 8,001,134 B2
(45) Date of Patent: Aug. 16, 2011

(54) METHOD FOR PERFORMING AN EXTERNAL (DISK-BASED) SORT OF A LARGE DATA FILE WHICH TAKES ADVANTAGE OF "PRESORTED" DATA ALREADY PRESENT IN THE INPUT

(75) Inventor: Peter Chi-Hsiung Liu, Paramus, NJ (US)

(73) Assignee: Syncsort Incorporated, Woodcliff Lake, NJ (US)

( * ) Notice: Subject to any disclaimer, the term of this patent is extended or adjusted under 35 U.S.C. 154(b) by 0 days.

(21) Appl. No.: 12/701,231

(22) Filed: Feb. 5, 2010

(65) Prior Publication Data
US 2010/0191749 A1    Jul. 29, 2010

Related U.S. Application Data

(63) Continuation of application No. 10/118,662, filed on Apr. 8, 2002, now Pat. No. 7,689,623.

(51) Int. Cl.
*G06F 17/30* (2006.01)

(52) U.S. Cl. ............................ 707/752; 707/723; 704/10

(58) Field of Classification Search ............. 707/752, 707/769, 700, 723; 711/114; 714/10
See application file for complete search history.

(56) References Cited

U.S. PATENT DOCUMENTS

| | | | |
|---|---|---|---|
| 4,210,961 A * | 7/1980 | Whitlow et al. | 707/752 |
| 4,510,567 A | 4/1985 | Chang et al. | |
| 4,677,550 A * | 6/1987 | Ferguson | 707/769 |
| 5,117,495 A | 5/1992 | Liu | |
| 5,121,493 A * | 6/1992 | Ferguson | 707/700 |
| 5,274,805 A * | 12/1993 | Ferguson et al. | 707/752 |
| 5,301,297 A | 4/1994 | Menon et al. | |
| 5,410,646 A | 4/1995 | Tondevold et al. | |
| 5,421,007 A | 5/1995 | Coleman et al. | |
| 5,551,018 A * | 8/1996 | Hansen | 707/752 |
| 5,563,998 A | 10/1996 | Yaksich et al. | |
| 5,563,999 A | 10/1996 | Yaksich et al. | |
| 5,613,085 A * | 3/1997 | Lee et al. | 711/114 |
| 5,659,733 A | 8/1997 | Yamashita | |
| 5,704,029 A | 12/1997 | Wright, Jr. | |
| 5,745,712 A | 4/1998 | Turpin et al. | |
| 5,852,826 A | 12/1998 | Graunke et al. | |
| 6,021,407 A | 2/2000 | Meck et al. | |

(Continued)

OTHER PUBLICATIONS

Knuth, Donald E. The Art of Computer Programming, vol. 3, 2nd Ed. Sec. 5.4.9. Addison Wesley Longman Inc, 1998.

(Continued)

*Primary Examiner* — Shahid A Alam
(74) *Attorney, Agent, or Firm* — Ronald Abramson; Hughes Hubbard & Reed LLP

(57) ABSTRACT

A method of externally sorting large files in a computer system is presented. The contents of the input file to be sorted are investigated in order to identify presorted portions thereof. The presorted portions of the input file as thus identified are incorporated as sorted strings into an external sortwork file, by rearranging directory information rather than physically transferring data. If merging is necessary, the data may then be merged by a procedure wherein blocks of sorted data to be merged are incorporated into an output (sortout) file, by rearranging directory information rather than physically transferring sorted blocks to the sortout file. As a result of the process, portions of sorted data incorporated into the sortout file may physically remain in external storage space allocated to the input file, and/or in external space allocated to sortwork, thereby eliminating or reducing reading and writing from disk during sort-merge processing.

7 Claims, 5 Drawing Sheets

U.S. PATENT DOCUMENTS

| | | | |
|---|---|---|---|
| 6,105,024 A * | 8/2000 | Graefe et al. | 707/752 |
| 6,275,822 B1 | 8/2001 | Consens et al. | |
| 6,298,321 B1 * | 10/2001 | Karlov et al. | 704/10 |
| 6,424,970 B1 * | 7/2002 | Arakawa et al. | 707/752 |
| 6,434,560 B1 * | 8/2002 | Case | 707/752 |
| 6,490,601 B1 | 12/2002 | Markus et al. | |
| 7,689,623 B1 * | 3/2010 | Liu | 707/752 |
| 2004/0181749 A1 | 9/2004 | Chellapilla et al. | |
| 2004/0205533 A1 | 10/2004 | Lopata et al. | |

OTHER PUBLICATIONS

Cormen et al., Introduction to Algorithms. MIT Press, © 2000, Introduction to Part II 137-139.

* cited by examiner

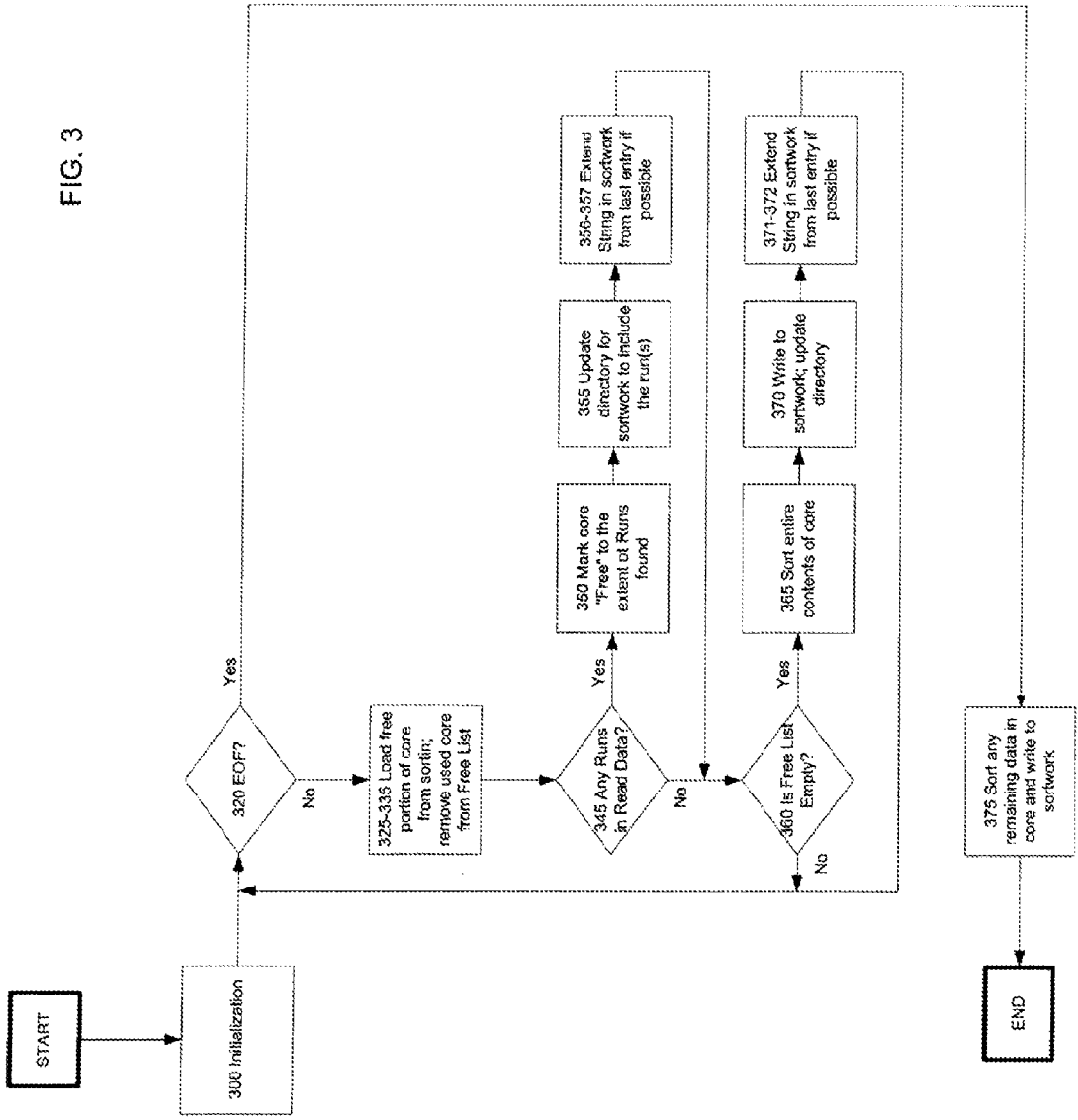

METHOD FOR PERFORMING AN EXTERNAL (DISK-BASED) SORT OF A LARGE DATA FILE WHICH TAKES ADVANTAGE OF "PRESORTED" DATA ALREADY PRESENT IN THE INPUT

CROSS-REFERENCE TO RELATED APPLICATIONS

This application is a continuation of U.S. patent application Ser. No. 10/118,662, filed Apr. 8, 2002, now U.S. Pat. No. 7,689,623 and claims the benefit of its filing date under 35 U.S.C. §120. The entire disclosure of said application is hereby incorporated by reference.

BACKGROUND OF THE INVENTION

1. Field of the Invention

The present invention is in the field of data processing, and relates more specifically to systems and methods for efficiently sorting large data files.

2. Description of Related Art

The sorting of data files that are too large to fit all at once in the random access memory of a computer system is known as "external sorting", because the data file to be sorted resides at least in part on storage media external to the computer's main memory. The speed-limiting factors in external sorting frequently concern aspects of reading and writing data from and to the external media, which are usually the slowest storage components in the system. External sorting was originally developed for data residing on tape drives and other sequentially accessible storage devices, and this technology was extended to disk and drum external storage. See Section 5.4.9 of D. Knuth, The Art of Computer Programming (Vol. 3, Rev. 1998).

There have been further developments to improve the efficiency of disk-based external sorting by taking advantage of the random access capabilities of these media. Commonly assigned U.S. Pat. No. 4,210,961 (Whitlow, et al.) discloses several such techniques.

Under current approaches, as illustrated in FIG. 1, external sorting is typically performed using a "sort-merge" procedure involving steps such as the following:

(1) "Pre-string generation phase"—setup, initialization and planning for the job.

(2) "String generation phase"—(a) reading a core load of data from the input file 100 (called "sortin") to an input buffer 102; sorting the core-load worth of data using an internal sorting algorithm (quicksort, shellsort, etc.), into an output buffer 104; and writing the sorted core load out as a sorted "string" to a temporary disk file called "sortwork" 105; and (b) repeating step 2(a) until the entire input file has been processed into one or more sorted strings (106, 108, etc.) in sortwork. If the pre-string generation phase (step (1)) showed that the entire input file could be sorted with one core load, then the sorted output is written directly to the output file, called "sortout" (110) and the process is completed. Otherwise, there must be a "merge phase."

(3) "Merge phase"—(a) (if necessary) successively merging as many strings in sortwork 105 as can be merged at once, in order to form a smaller number of longer sorted strings; (b) (if necessary) repeating step 3(a) until only one further merge pass is needed in order to obtain a single sorted string; and (c) the "final merge" (which, depending on the size of the input file, may be the only merge pass, obviating the foregoing steps 3(a) and 3(b)), in which the last set of strings are merged and the result written, as a fully sorted single string, to sortout 110.

The prior art sort-merge technique is capable of efficiently ordering large data files that are initially presented in completely random order. The prior art approach, however, in certain aspects, assumes the "worst case" of random input. As a result, it typically requires, for a large input file, the input file 100 (sortin) to be read in its entirety and the sortwork file 105 to be written in its entirety, and then for the sortwork file 105 to be read in its entirety and the output file 110 (sortout) to be written in its entirety. A considerable amount of costly disk activity is thus entailed.

In practice, however, many input files are in a partial "presorted" condition even before they are subjected to the sort operation. Some files are updated in production by appending new records to the end of an already sorted base file, leaving the sorted base data completely intact. Other files are minimally modified between sort jobs, leaving long runs of sorted data in the file. Indeed, on occasion, some input files are provided in 100% sorted order. To "sort" such files could require doing very little, or practically nothing, if it were thought to take advantage of the presort condition already existing in the file. It would be most preferred in such a case if the successive reading and writing to and from disk as noted above could be eliminated or reduced.

BRIEF SUMMARY OF THE INVENTION

Accordingly, it is an object of the present invention to provide a system and method for external sorting that takes advantage of any presort condition already existing in the input file, and which avoids or minimizes reprocessing, re-reading or re-writing such data.

In one embodiment, these and other objects of the invention are achieved by implementing a series of steps comprising:

(a) In the pre-string generation phase, and/or the string generation phase, investigating the sort input (sortin) file in order to identify presorted portions;

(b) in the string generation phase, (i) transposing runs of presorted data found in sortin to sortwork, by rearranging pointers to on-disk data, thereby avoiding the step of having to write such data physically to sortwork, and (ii) referencing as a single string those strings which, as thus processed, are determined to be contiguous and in order; and (c) in the merge phase, using address and key information known from having performed the investigation and sorting steps, in order to identify blocks that are already in merge order, and transposing said blocks to sortout without any further reading or writing of their data.

The details of this and other embodiments will be more apparent from a review of the accompanying drawings and of the description that follows.

BRIEF DESCRIPTION OF THE DRAWINGS

FIG. 3 is a flow chart showing the processing steps in the sort phase of one embodiment of the invention.

DETAILED DESCRIPTION OF THE PREFERRED EMBODIMENTS

Figure 4A:
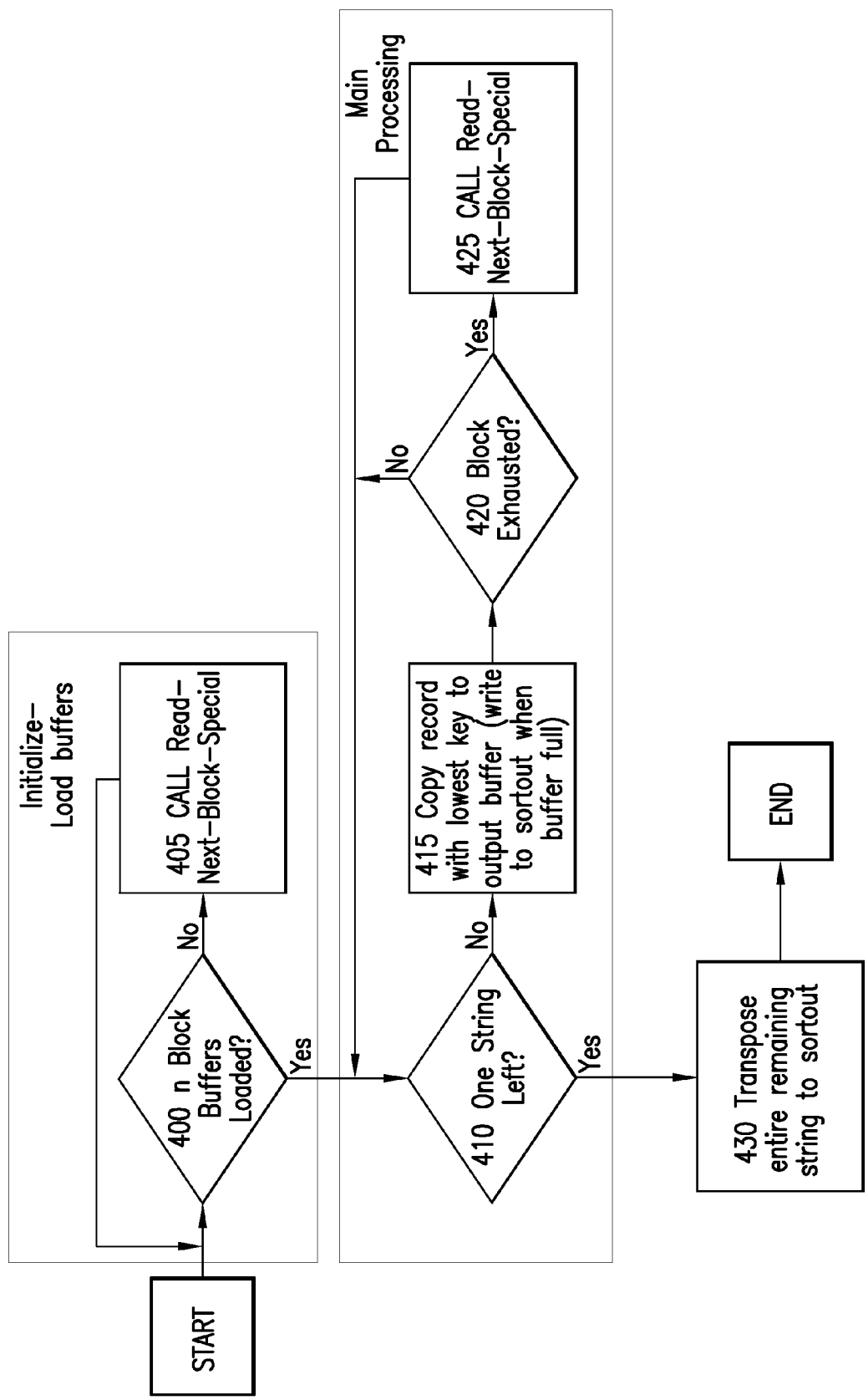
FIG. 4A is a flow chart showing the processing steps in the merge phase of one embodiment of the invention.
Figure 4B:
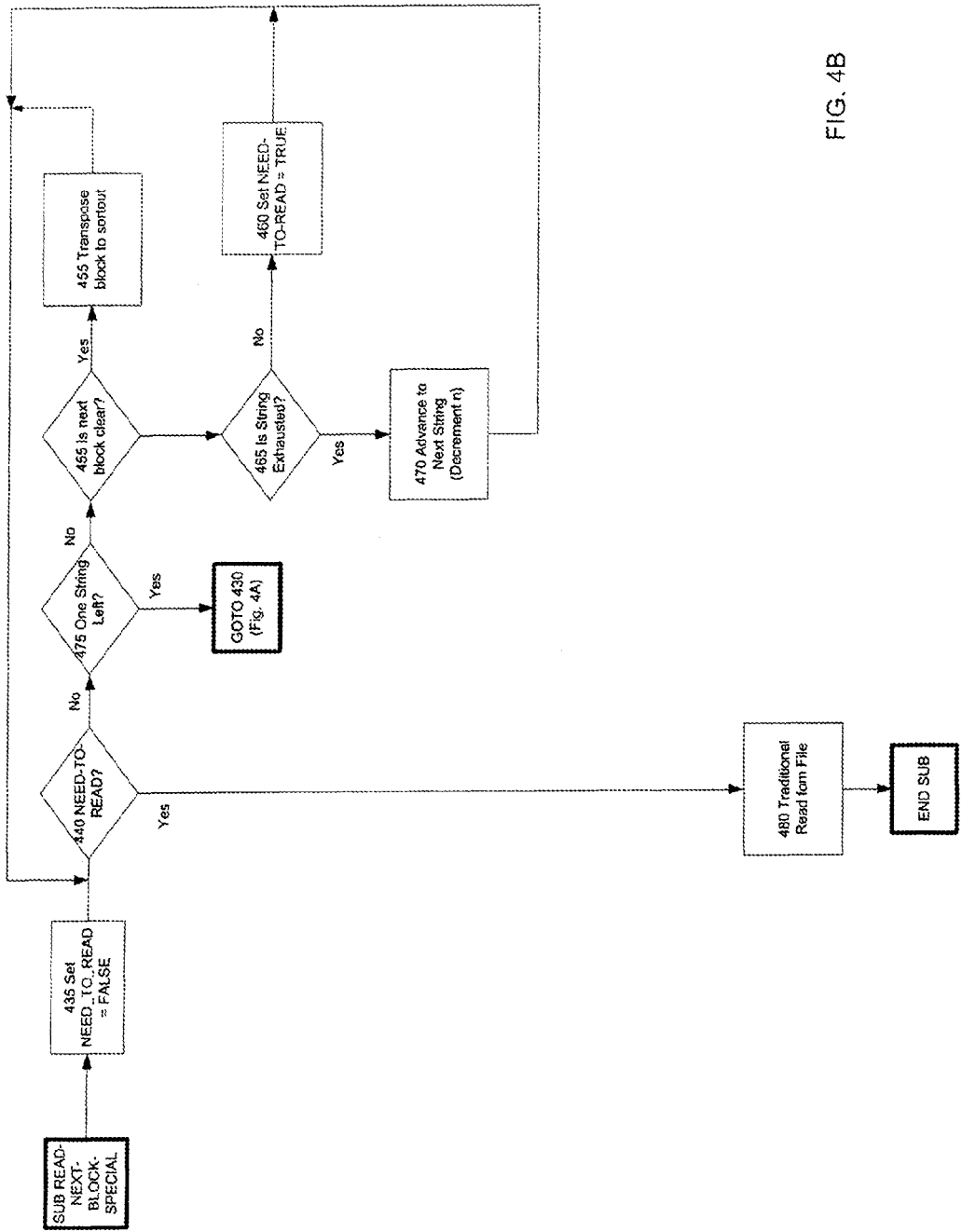
FIG. 4B shows the steps in a block reading subroutine that can be used in that embodiment.

One embodiment of the invention is illustrated in FIGS. 3-4B and described in the text that follows. Although the invention has been most specifically illustrated with a particular preferred embodiment, its should be understood that the invention concerns the principles by which such embodiment may be constructed, and is not limited to the specific sequence of processing steps shown. Further, disclosure of process steps in a particular order or numbering of steps for purposes of illustration should not be understood to necessarily imply that the specified steps can only be performed in the order given.

Typical Disk Storage Systems

Disk-based data resides on disk drives and are organized on the drives in accordance with a "file system." There are hardware and organizational aspects to such systems.

Hardware Aspects

Figure 2A:
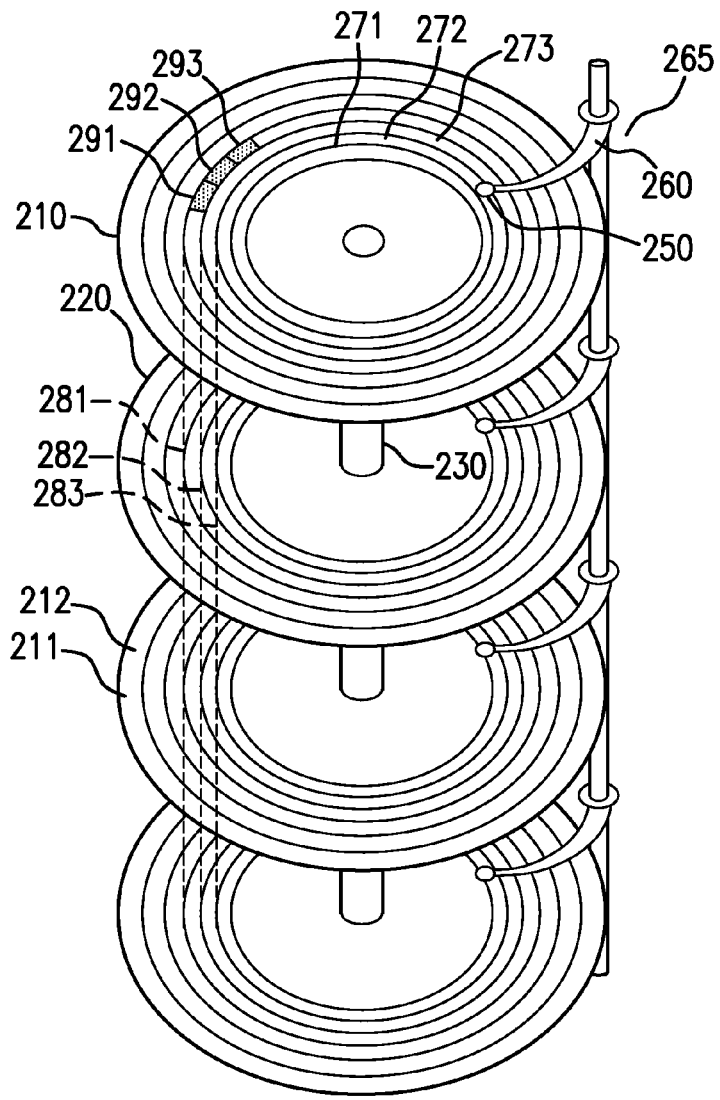
FIG. 2A is diagram showing the geometry of an exemplary disk drive storage device.
Figure 2B:
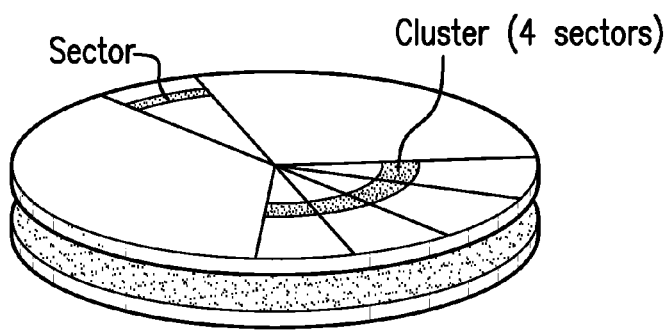
FIG. 2B is a diagram representing sectors and a cluster on an exemplary disk.

A typical physical configuration used in modern disk drives is shown in FIG. 2A. The storage areas of the device comprise a plurality of stacked platters 210, 220, etc., which spin in unison on a spindle 230. Each platter has two surfaces, 211, 212, one or both of which may be used for data storage.

The surfaces are accessed with one or more read/write heads 250, etc. mounted on corresponding arms 260, etc., which are also movable in unison as a single structure 265 in a stepwise fashion, to address narrow concentric rings 271, 272, 273, etc. on each surface. These rings are called "tracks." The movement of arm structure 265 is such that the read/write heads move in and out across the surface, to address tracks at different radii from the center of the spindle.

A set of vertically stacked tracks (i.e., one for each surface) is called a "cylinder" (281, 282, 283, etc.). Within each track are a series of "sectors" (291, 292, 293 etc.), each holding some number of bytes determined by the disk formatting, for example, 512 bytes per sector.

The term "latency" refers to the rotational time delay in having a given sector spin around, so as to be under the corresponding head. The term "seek" time refers to the time delay resulting from having to reposition the read/write arm structure 265 to address a different set of tracks. Of all disk operations, seeking a new cylinder can be the most time consuming.

Organization of File Systems on Physical Disks

In modern file systems, for example, the NTFS file system of various Microsoft® Windows® implementations, disk files are organized with directory structures containing pointers to the data blocks constituting a file. The physical order of data on the medium is independent of the logical order reflected in the list of pointers maintained by the disk directory.

For example, the NTFS file system referred to above stores disk directory and file information in a Master File Table (MFT). The MFT holds numerous disk, directory and file attributes. Within the information maintained on each file in the MFT are two series of cluster numerations, which keep track of data clusters in a file. (In the terminology of NTFS, a "cluster" is a data block, which contains a power of two (e.g., 256, 512, etc.) number of sectors. The first, the "Virtual Cluster Number" (VCN), refers to the order of the data in the file, starting at 0 and running to the last cluster, for example, the mth cluster. The second number, the "Logical Cluster Number" (LCN) represents the numbering of all physical clusters, from the beginning of the volume to the end. LCNs may be converted to a physical disk address by multiplying the LCN by the cluster factor to get the physical byte offset on the volume. (The "cluster factor" is the block size (number of bytes per cluster), for example, 4,096 bytes (4K), in the case of clusters consisting of eight sectors of 512 bytes each, though large drives can have larger cluster factors.) From this, the disk drive interface (driver) can readily calculate platter, track and sector addresses, to accurately position the disk read head.

It is seen that VCNs are pointers to data, and that there is nothing that requires that the VCNs denoting the data clusters comprising a file to be stored in a contiguous manner on the disk, or even that they be recorded in order. Indeed, it is very often the case that a file's VCNs are neither contiguous nor in order.

For purposes of the discussion that follows, the term "directory pointer" will mean a VCN, or similar structure or information in a file system other than NTFS, that indicates the physical on-disk location of a given block of data associated with a file stored on the disk.

Application to External Sorting

It may be seen from the foregoing that the directory structure of NTFS and similar modern file systems are adapted to organizing data in persistent, machine-readable storage (e.g., disk data) by reorganizing directory pointers as opposed to physically moving data on the disk. This aspect of the file system may be used to advantage in sorting externally stored data having a partial (or total) presorted condition.

In one embodiment of the present invention, during the string generation phase, a "run" of input data which is already in sorted condition can be left physically where it is found in an input file (sortin), and by rearrangement of directory pointers, may be included, without physically copying or moving any data, in what is regarded as the "sortwork" file. (The process mentioned in the preceding sentence of moving data from file to file by reassigning directory pointers rather than physically copying the data is referred to herein as "transposing" the data from one file to the other.) In the merge phase (if necessary), some of the data destined for sort ouput file (sortout) may be transposed again, from the original position in sortin, as well as from sortwork, again without reading or writing such data itself. Thus, disk reading and writing may be greatly reduced.

Pre-String Generation and String Generation (Sort) Phases

The existence of presorted data in the sortin file may be determined either in the pre-string generation (sort) phase, or during the string generation phase. Since these blocks are already in order, they may be carried over into sortwork file by mere rearrangement of pointers, without physically copying any data (transposition). Data in sortin that is found not to be presorted must (in this embodiment) be sorted and physically written out to sortwork, as strings. In other words, as much of the input as can be transposed is transposed without being sorted or written, and the remainder is sorted and written.

If possible, the sorted strings are concatenated during the sort phase, to thus form the longest strings possible in sortwork. I.e., when updating or writing to sortwork, the high and low keys of the run or block involved are examined, and if the low key of the current run or block is higher than the high key of the one just processed, the run just so written may be extended to include the new data, to thus result in a longer run (and thus fewer strings to merge).

After the sort phase, the sortwork file consists of strings comprised of any presorted blocks whose data still resides in the space of sortin, as well as those blocks that were sorted and physically written to sortwork.

The string generation phase of such an embodiment may be implemented using a computer program reflecting the operations set forth in the following or similar pseudocode. The numbered steps in the pseudocode listed below correspond to the reference numerals of FIG. 3, which is a flow chart of the same process:

---
Listing 1: Example String Generation Phase
---
STRING GENERATION:
300 Initialize:
    305 Allocate core for sorting
    310 Mark all (allocated) core as "free" // (Put all core addresses on
        "freelist")
    315 Point to beginning of sort input file ("sortin")
    317 Open sortwork file
320 Repeat until reach end of sortin file:
    325 Load free portion of core from sortin
        330 Read in logical data order from sortin
        335 Remove core thus filled from free list
        // (Note that after reading full core load, free list will be empty)
    // (Note - a "run" is a continuous string of presorted data that is longer
        than some threshold length)
    340 Examine string that was just read and determine location of any "runs"
    345 If run(s) contained within string that was read
        350 Mark core "free" to the extent of the run(s) found
        355 Update sortwork index (block pointers) to append the sorted run(s)
            found // ( i.e., without moving any data)
            356 If low key of current run is higher than high key of the
                preceding run written, treat current run as an extension of
                prior run
            357 Update memory structure with disk pointers and high and low
                keys for each run
    360 If free list is empty // (i.e., no sorted runs are in core after
        latest read operation)
        365 Sort the entire contents of core // (internal sort)
        370 Write to sortwork and update sortwork index (block pointers ) to
            reflect what was just written
            371 If low key of current run is higher than high key of the
                preceding run written, treat current run as an extension of
                prior run
            372 Update memory structure with disk pointers and high and low
                keys for each run
375 Cleanup:
    380 If left with partial core load from the end of the input file, sort
        that, and write it to sortwork (and update sortwork index accordingly)
END

---

The "core" referred to in the above pseudocode refers to any machine-readable memory accessible by the computer processor. The sortwork index referred to in the pseudocode can be a separate data structure used to modify the directory structure (or other arrangement of pointers to disk data) for the sortwork file, or, in suitable operating systems, it can be the directory structure itself, since in those systems the directory itself comprises a list of such data block pointers.

Merge Phase

The merge phase of the present invention (where it is necessary) involves a modification of a conventional "n-way merge" algorithm.

In a conventional n-way merge the records in blocks from the sorted strings to be merged are sequentially examined and written back to sortwork (or, on the final pass, sortout) based on key comparison with the records in the other blocks. (Sortwork space may be reused during a merge phase having more than one merge pass, as taught in Whitlow, et al., U.S. Pat. No. 4,210,961.)

When a block of data is exhausted, it is replenished by reading the next block from the string. If a string is used up, the order or "power" of the merge, n, is decremented, and processing continues until n is reduced to one.

The merge procedure of the present invention takes advantage of the fact that there is already recorded in working memory information sufficient to determine, without again reading from the disk, the high and low keys for every block in sortwork, as well as the physical location of each block.

Accordingly, whenever it is necessary to fetch a block of data in connection with the conventional n-way merge algorithm, a test is added before actually reading the block. If the high key of the block about to read is less than the low keys of the other blocks in the set (including, during initialization, the blocks to be read in order to initially fill the buffers), then the consequence is that this block can be passed directly to sortout. Moreover, since all of the high and low key values and block locations were already known prior to beginning the merge step, the block in question may be "transposed" to sortout without actually being read from or written to disk.

If the test described in the preceding paragraph succeeds, then the next block is tested, and the process is repeated. Note that it is not necessary to actually read a block from the disk until the test fails. If the test does fail, and upon reading, it is found that the string is exhausted, the string count (merge order) is reduced by one, and if that should reduce the string count so that it equals one one, the n-way merge is exited and the process is completed by transposing directly to sortout whatever then remains of the last string. Otherwise, the conventional merge algorithm is applied (until it is necessary to read another block).

In any event, when only one string remains in sortwork, that string is simply transposed directly to sortout.

The merge phase of one embodiment may be implemented using a computer program reflecting the operations set forth in the following or similar pseudocode. The numbered steps in the pseudocode listed below correspond to the reference numerals of FIG. 4A, which is a flow chart of the same process, and FIG. 4B, which is a flow chart of a block-read subroutine which may be used in such process:

---

Listing 2: Example Merge Phase

---

```
MERGE:
    // initialize - fill buffers
    400 FOR i = 1 TO n {
        405 CALL Read-Next-Block-Special( Buffer(i), String(i) )
    }
    // process -
    410 Repeat until one string left {
        415 copy to output buffer the record(i) among n records that has
            lowest key
        420 IF this exhausts a block, THEN {
            425 CALL Read-Next-Block-Special(Buffer(i), String(i))
        }
    }
LAST-STRING:
    430 Transpose entire remaining single string to sortout
END
SUBROUTINE: Read-Next-Block-Special(Buffer(i),String(i))
    435 Initialize: Need-to-Read = FALSE
    440 REPEAT UNTIL ( Need-to-Read ) {
        441 IF ( n == 1 ) THEN GOT0 430
        445 Compare (without file I/O) low key of block about to be read from
                String(i) with high keys of the n-1 other blocks in the merge
                buffers
        455 IF comparison OK (higher) THEN transpose this block to sortout
        460 ELSE IF comparison failed THEN Need-to-Read = TRUE
        465 ELSE IF String(i) exhausted THEN
            470 DELETE string(i) and DECREMENT n // look to next string
    }
    480 Traditional-Read-From-File( Buffer(i), String(i) )
END SUB
```

---

The main routine "Merge" is a traditional n-way merge, modified in its block read function, shown here as subroutine "Read-Next-Block-Special( )", and in that the last remaining string in the merge process is always simply transposed to sortout. In this subroutine, before a block is read by file 110, a key comparison 445-455 is executed, based on information in memory from the sort phase, to determine if the block about to read can instead be transposed directly to sortout. The process is repeated until the comparison fails (460), or until all but the last string have been processed (441). In the latter case, control is transferred directly to the LAST-STRING label, which (430) transposes the one remaining string to sortout. If in the course of this input processing a string is exhausted and this leaves more than one string, the read process simply moves on to the next string (470). If the comparison fails, then it is necessary to acquire and merge the data from the block in question, so a traditional read (with file 110) is performed (480) and the subroutine returns.

Note that it is immaterial in this operation where the incoming blocks actually reside, as between sortin and sortwork. However, if, in this process, data in sortin has been transposed to sortout, then some of the same data blocks will be shared by both files, and the manner in which the operating system handles shared blocks of this nature must be taken into account. Some operating systems accommodate such sharing by automatically creating another block when the data changes for one of the referencing files. In other operating systems, sortin will be deleted after sorting or replaced by sortout, in which case the sorting software, on completion, may transpose data as necessary by rearranging directory pointers.

An example will illustrate some of the efficiencies that might be achieved by the present invention. In data processing it is often the case that the same data repository is periodically sorted, on a repetitive basis. It may be the case on occasion with such an input file (or in numerous other circumstances) that the input file is already 100% sorted before the sort process is carried out.

Figure 1:
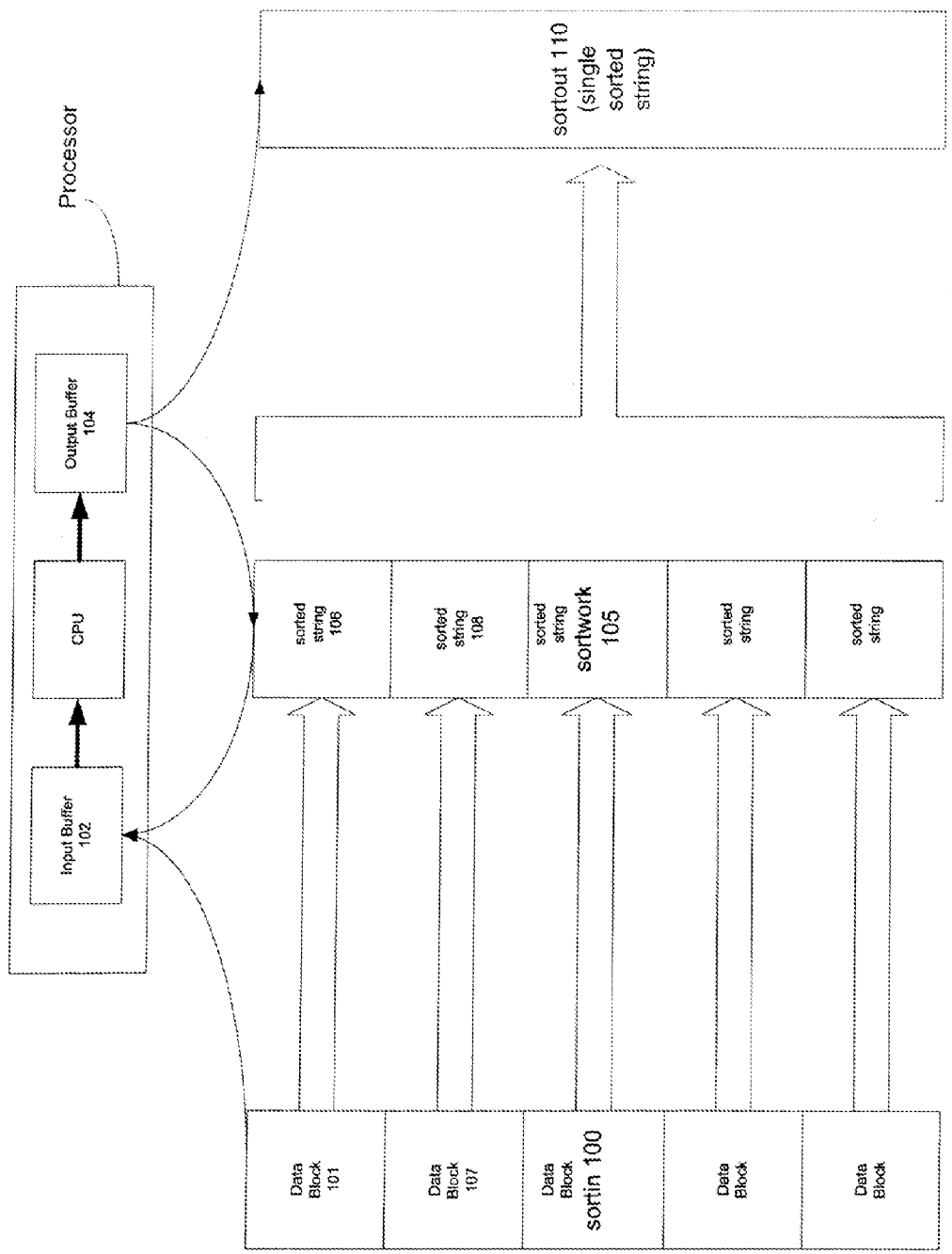
FIG. 1 is a functional block diagram showing a current (prior art) method for external sorting.

If a conventional sort-merge procedure is employed, it will be seen by reference to FIG. 1 that there will be two complete file reads, two complete file writes, plus internal sort of all blocks, and merge of all strings, at the record level.

If such a file were to be processed in accordance with the present invention, the majority of this processing would be eliminated. In the sort phase, the input file would be read once. Each core load would be "transposed" to sortwork (without writing to disk) in step 350 of FIG. 3. None of this data would have to be sorted. There would be nothing left in core at the end of this process, so step 375 would have nothing to do and the sort phase would end. The "sortwork" file would consist of all of the still in-place data from the input file. In accordance with steps 356-357, at the end of the sort phase, the data in the file would be regarded as one fully sorted string.

In any preferred embodiment, the software would recognize this situation and by changing the disk directory, treat the input file as sortout, and the job would be complete. If the software were to invoke the merge phase, then in step 441, entire string would immediately be transposed to sortout, without reading from or writing to disk, and without actually merging any records, and the process would end.

Thus, in accordance with the present invention, there is one complete read of the input file, plus fast key comparisons and pointer reassignments at the block and string level. This represents a better than 75% improvement in efficiency over conventional processing, which by contrast requires reading and writing the entire file's worth of data four times and considerably additional internal processing.

It is apparent from the foregoing that the present invention achieves the specified objects, as well as the other objectives outlined herein. The present invention has been described in terms of the preferred embodiments of the invention, which are presented for purposes of illustration and not of limitation. It will be appreciated that modifications, variations and features will occur to one of ordinary skill in the art given the benefit of the disclosure, which modifications, variations and features will be within the scope of the invention as defined in the following claims.

I claim:

1. A method for performing the string generation phase of a sort merge process in a computer, upon data in a first file comprising data blocks in a sortin file residing in persistent machine-readable storage, wherein said data may contain presorted portions, said method comprising:
   (a) reading a portion of the sortin file into a first machine-readable memory area and noting in a second machine-readable memory area the locations on said persistent machine-readable storage from which the blocks of said portion were read;
   (b) determining the location of any presorted runs existing in said read portion;
   (c) marking as free the memory locations in said first memory area that are occupied by said presorted runs and noting in said second machine-readable memory area the locations in said persistent machine-readable storage from which the blocks of said presorted portions had been read;
   (d) repeating the preceding three steps until either all data in the sortin file has been read or until said first memory area is full, and then sorting any data remaining in said first memory area, writing said sorted data to said persistent machine-readable storage, and noting in said second machine-readable memory area the locations in said persistent machine-readable storage area of said sorted data that was so written; and
   (e) writing a file directory structure for a second file in persistent machine-readable storage, incorporating therein said locations of the blocks of said presorted runs and the locations of the blocks of said sorted data.

2. The method of claim 1, wherein said second file is a sortwork file.

3. The method of claim 2, further comprising:
   (a) during said string generation phase, noting in said second machine-readable memory area the high and low keys of each data block read from said machine-readable persistent storage;
   (b) performing a merge phase of the data in said sortwork file into a sortout file; and
   (c) during said merge phase reading each block of each sorted string from said sortwork file if comparison of said keys for said block reflects that said block is not part of a run, and otherwise including said block into said sortout file by writing its block locations into the directory structure of said sortout file without physically reading or moving the data in said block.

4. The method of claim 1, wherein said second machine-readable memory area comprises a directory structure maintained by an operating system of said computer for said persistent machine-readable storage.

5. The method of claim 3, wherein said sortin file is deleted, by an operating system of said computer, after said merge phase.

6. The method of claim 3, wherein said sortin file is replaced by said sortout file, by an operating system of said computer, after said merge phase.

7. The method of claim 1, wherein said sortin file is comprised in its entirety by one fully sorted presorted portion, and wherein no data from said sortin file is sorted and no data from said sortin file is physically moved from said sortin file to said second file.

* * * * *